(12) United States Patent
Kim (10) Patent No.: US 7,930,895 B2
(45) Date of Patent: Apr. 26, 2011

(54) BRUSHLESS DIRECT CURRENT MOTOR, COMPRESSOR AND AIR CONDITIONER HAVING THE SAME

(75) Inventor: Jong-goo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 918 days.

(21) Appl. No.: 11/841,108

(22) Filed: Aug. 20, 2007

(65) Prior Publication Data

US 2008/0191587 A1 Aug. 14, 2008

(30) Foreign Application Priority Data

Feb. 12, 2007 (KR) .................. 10-2007-0014524

(51) Int. Cl.
- *F25B 1/00* (2006.01)
- *F25B 49/00* (2006.01)
- *H02H 7/00* (2006.01)
- *H02H 5/04* (2006.01)

(52) U.S. Cl. .......... 62/228.4; 62/228.1; 361/22; 361/24; 361/25

(58) Field of Classification Search .................. 62/228.1, 62/228.3, 228.4; 361/22, 24, 25, 26; 337/85, 337/97, 380; 310/68 C; 417/218, 223
See application file for complete search history.

(56) References Cited

U.S. PATENT DOCUMENTS 6,005,471 A * 12/1999 Higashikata et al. ......... 337/347
6,112,535 A * 9/2000 Hollenbeck .................. 62/228.4

FOREIGN PATENT DOCUMENTS

| CN | 1501570 | 6/2004 |
|---|---|---|
| JP | 05-202860 | 8/1993 |
| JP | 09021385 A * | 1/1997 |
| JP | 10021808 A * | 1/1998 |
| KR | 1999-0083639 | 11/1999 |
| KR | 10-0246895 | 12/1999 |
| KR | 2000-0036317 | 7/2000 |
| KR | 2001-0046392 | 6/2001 |

OTHER PUBLICATIONS

Korean Office Action issued Sep. 23, 2008 in KR Application No. 2007-0014524.
Chinese Office Action issued Mar. 30, 2010 in CN Application No. 20081000908.3.

* cited by examiner

*Primary Examiner* — Chen-Wen Jiang
(74) *Attorney, Agent, or Firm* — Stanzione & Kim, LLP (57) ABSTRACT

A brushless direct current motor, includes a rotor which comprises a permanent magnet, a stator which comprises coils associated with a plurality of phases which form an electrical field for generating a torque by interaction with a magnetic field which is generated by the permanent magnet, and a load prevention part which is disposed inside the stator to electrically connect and disconnect the coils of the plurality of phases according to a temperature variation.

12 Claims, 9 Drawing Sheets

BRUSHLESS DIRECT CURRENT MOTOR, COMPRESSOR AND AIR CONDITIONER HAVING THE SAME

CROSS-REFERENCE TO RELATED APPLICATIONS

This application claims priority from Korean Patent Application No. 10-2007-0014524, filed on Feb. 12, 2007 in the Korean Intellectual Property Office, the disclosure of which is incorporated herein by reference.

BACKGROUND OF THE INVENTION

1. Field of the Invention

A brushless direct current motor, a compressor and an air conditioner having the same consistent with the present general inventive concept relate to improving a configuration preventing an overload of a brushless direct current motor.

2. Description of the Related Art

In general, an air conditioner acting as a heat pump operates in a heating mode and a cooling mode according to a demand of a user. For example, the heat pump heats a room in the heating mode in winter, and cools the room in the cooling mode in summer. Also, the heat pump may adjust the humidity of the room, and clean the air of the room.

In general, the heat pump includes an indoor unit including an indoor heat exchanger to heat or cool a room and an indoor fan, and an outdoor unit including an outdoor heat exchanger, an outdoor fan and a compressor.

During a heating cycle in the heating mode, at first, the compressor compresses a refrigerant. The compressed refrigerant is supplied to the indoor heat exchanger, and air which is heated by the indoor heat exchanger is discharged into the room, thereby heating the room.

In a cooling cycle of the cooling mode, at first, the compressor compresses the refrigerant. The compressed refrigerant is supplied to the outdoor heat exchanger and evaporated in the indoor heat exchanger, and air which is cooled by the indoor heat exchanger is discharged into the room, thereby cooling the room. The refrigerant subject to the heat-exchange operation in the indoor unit is supplied to the outdoor heat exchanger.

In the cooling and heating processes, the compressor repeats a compressing process of the refrigerant. The air conditioner successively performs compression, condensation, expansion and evaporation processes.

In general, a compressor includes a driving shaft rotated by a magnetic flux variation of a brushless direct current motor provided with a stator and a rotor having a permanent magnet, and a rolling piston coupled to an eccentric part of the driving shaft to rotate in an inner space of a cylinder as the driving shaft rotates.

Also, the compressor includes a control part to control an operation of the brushless direct current motor based on various sensors to achieve a stable and safe operation. The sensors may sense the position of the rotor, or include a thermostat which senses temperature. However, the brushless direct current motor may be required to be used under poor environmental conditions, which may be problematic for the sensors.

Accordingly, if the stator is provided with a temperature sensor and the brushless direct current motor is used under poor environmental conditions, the temperature of the environment in which the brushless direct current motor is used may improperly influence the temperature sensor.

SUMMARY OF THE INVENTION

The present general inventive concept provides a brushless direct current motor, a compressor and an air conditioner having the same operable within various environments.

The present general inventive concept also provides a brushless direct current motor, a compressor and an air conditioner having the same with a simple configuration more accurately responsive to the temperature of the motor of the environment in which it is used, thereby improving reliability.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept can be achieved by providing a brushless direct current motor, including a rotor which includes a permanent magnet, a stator which includes a coil of a plurality of phases which forms an electrical field to generate a torque by interaction with a magnetic field which is generated by the permanent magnet, and a load prevention part which is disposed inside the stator to electrically connect and disconnect the coil of the plurality of phases according to a temperature variation.

The load prevention part may be disposed to an area in which the coil of the plurality of phases crosses each other.

The load prevention part may include a casing which is coupled to the stator to be connected with the coil, a moveable member which is disposed to the casing to connect each phase of the coil of the plurality of phases, and a transformable member which is coupled to the casing to move between a connected position in which the moveable member is connected with the coil, and a disconnected position in which the moveable member is disconnected from the coil.

The transformable member may include a bimetal.

The load prevention part further may include an elastic member which elastically presses the moveable member toward the transformable member.

The foregoing and/or other aspects and utilities of the present general inventive concept can be achieved by providing a compressor, including a brushless direct current motor which includes a rotor which includes a permanent magnet, a stator which includes a coil of a plurality of phases which forms an electrical field for generating a torque by interaction with a magnetic field which is generated by the permanent magnet, and a load prevention part which is disposed inside the stator to electrically connect and disconnect the coil of the plurality of phases according to a temperature variation, and a cylinder which compresses a refrigerant by rotation of the brushless direct current motor.

The load prevention part may be disposed to an area in which the coil of the plurality of phases crosses each other.

The load prevention part may include a casing which is coupled to the stator to be connected with the coil, a moveable member which is disposed to an inner side of the casing to connect each phase of the coil of the plurality of phases, and a transformable member which is coupled to the casing to be transformed according to a temperature variation to move the moveable member.

The load prevention part further may include an elastic member which elastically presses the moveable member toward the transformable member.

The compressor may further include a control part which controls the brushless direct current motor not to operate if the transformable member is transformed to separate the moveable member from the coil.

The foregoing and/or other aspects and utilities of the present general inventive concept can also be achieved by providing an air conditioner, including a compressor which compresses a refrigerant, a heat exchanger which evaporates the refrigerant which is compressed by the compressor, and a fan which forms a flow to allow heat exchange with the heat exchanger.

The foregoing and/or other aspects and utilities of the present general inventive concept can also be achieved by providing a brushless direct current motor comprising a rotor, a stator including a coil, a moveable conductor, to establish a current path with the coil when at a first position and to cause a short in the current path when at a second position.

BRIEF DESCRIPTION OF THE DRAWINGS

The above and/or other aspects and utilities of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The exemplary embodiments are described below so as to explain the present general inventive concept by referring to the figures.

An air conditioner according to the present general inventive concept may be applied to a ceiling type conditioner, a window mounting type conditioner, a floor standing type conditioner, etc. As used herein, an air conditioner includes both an air conditioner used as a heat pump for heating and cooling, and an air conditioner used only for cooling. Hereinafter, an air conditioner including an indoor unit and an outdoor unit will be described as an exemplary embodiment of the present general inventive concept. The air conditioner in this example is used as a heat pump.

As illustrated in FIGS. 1 to 5B, an air conditioner 100 according to an exemplary embodiment of the present general inventive concept includes an outdoor unit 120 including a compressor 210, an outdoor heat exchanger 121, and an outdoor fan 123. The air conditioner 100 may further include an indoor unit 110.

Figure 1:
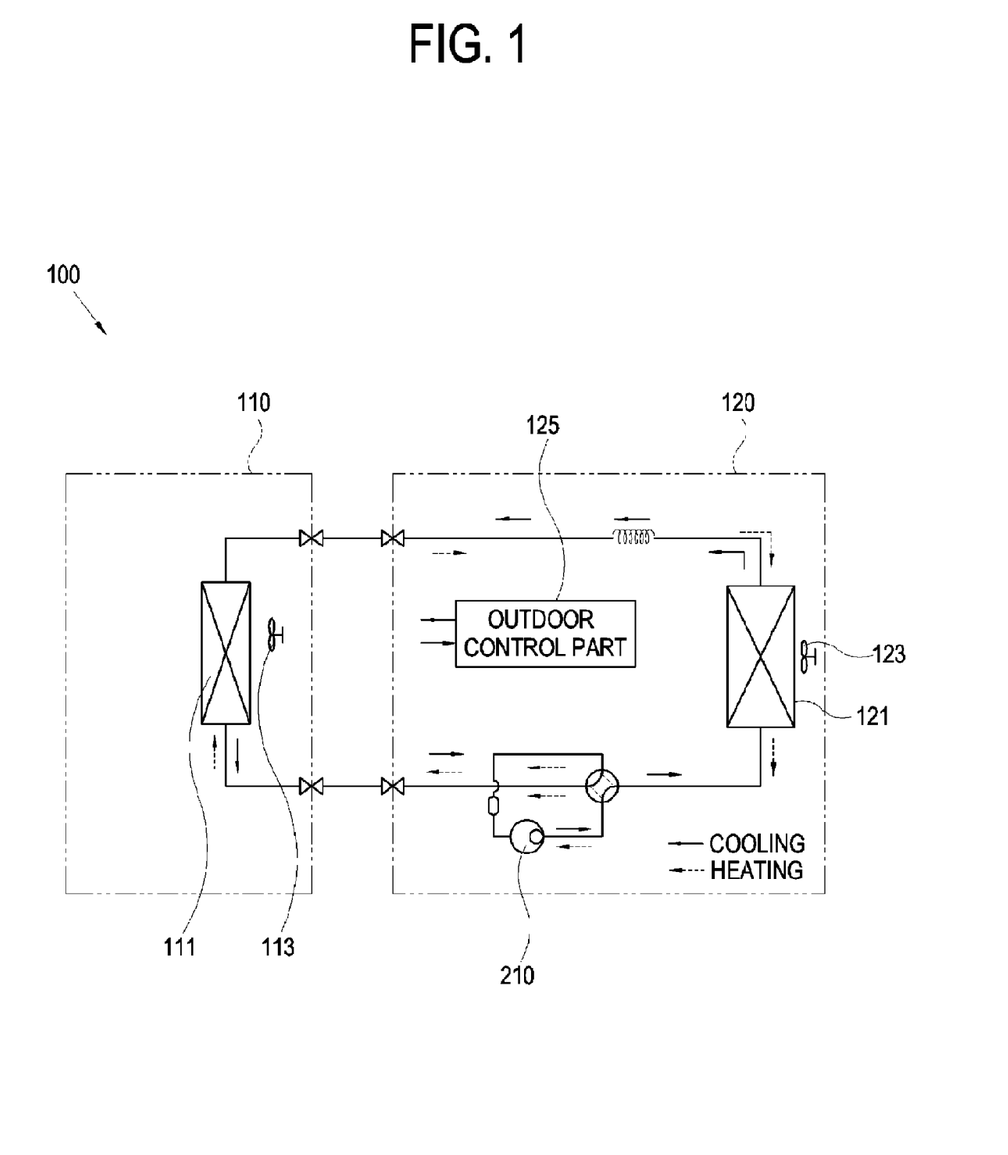
FIG. 1 is a schematic view of an air conditioner according to an exemplary embodiment.

The indoor unit 110 is disposed in a room such as an office to cool or heat air of the room. The indoor unit 110 includes an indoor heat exchanger 111 which a refrigerant compressed by the compressor 210 circulates, and an indoor fan 113 to circulate an indoor air to be heat-exchanged with the indoor heat exchanger 111. The indoor unit 110 includes an indoor control part (not shown) to control driving of the indoor fan 113 depending on an input information inputted by a user.

The outdoor unit 120 includes the compressor 210, the outdoor fan 123 and the outdoor heat exchanger 121. The outdoor unit 120 includes an outdoor control part 125 electrically connected with the indoor unit 110 by wireless or wired connections to control the compressor 210, the outdoor fan 123, etc. The outdoor fan 123 is disposed to be adjacent to the outdoor heat exchanger 121, and circulates an outdoor air to exchange heat with the outdoor heat exchanger 121.

The outdoor heat exchanger 121 is disposed on an air flow path of the outdoor fan 123 to exchange heat with the outdoor air.

Figure 2:
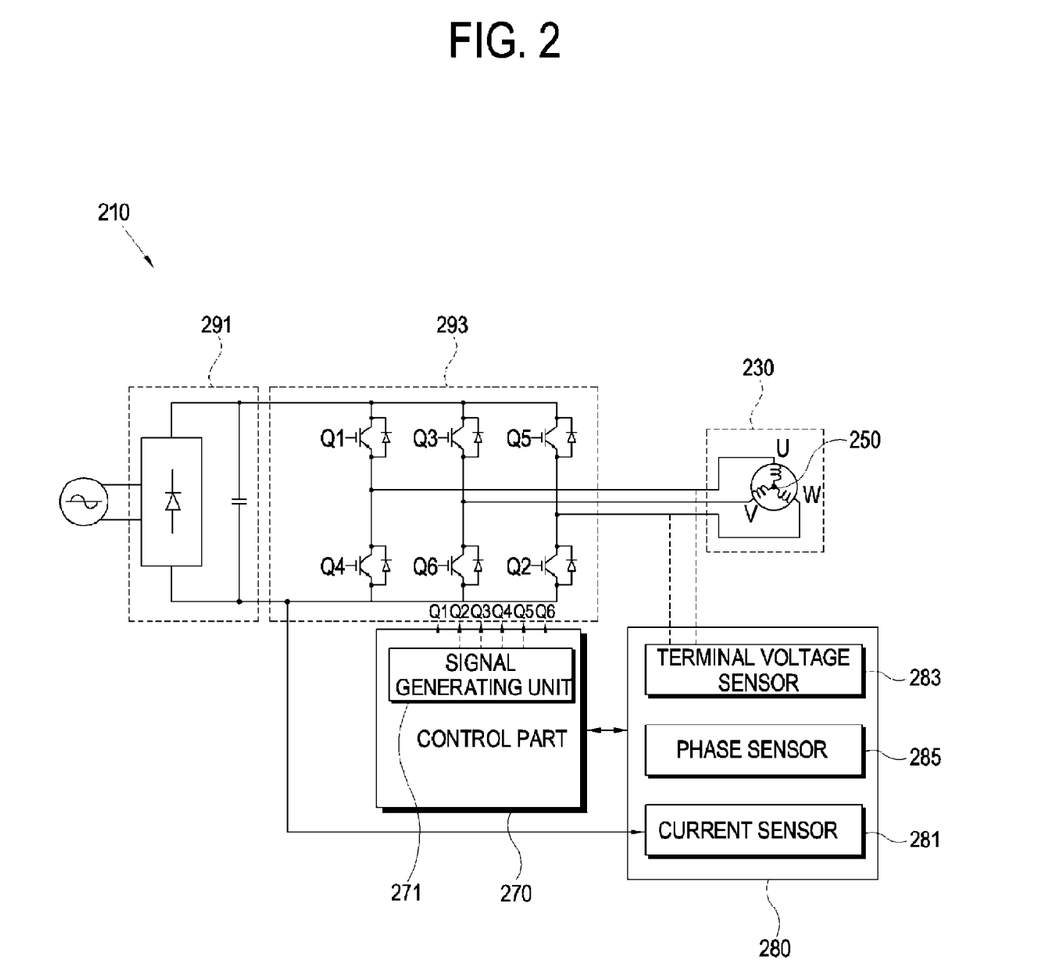
FIG. 2 schematically illustrates a configuration of an outdoor control part in FIG. 1.
Figure 3:
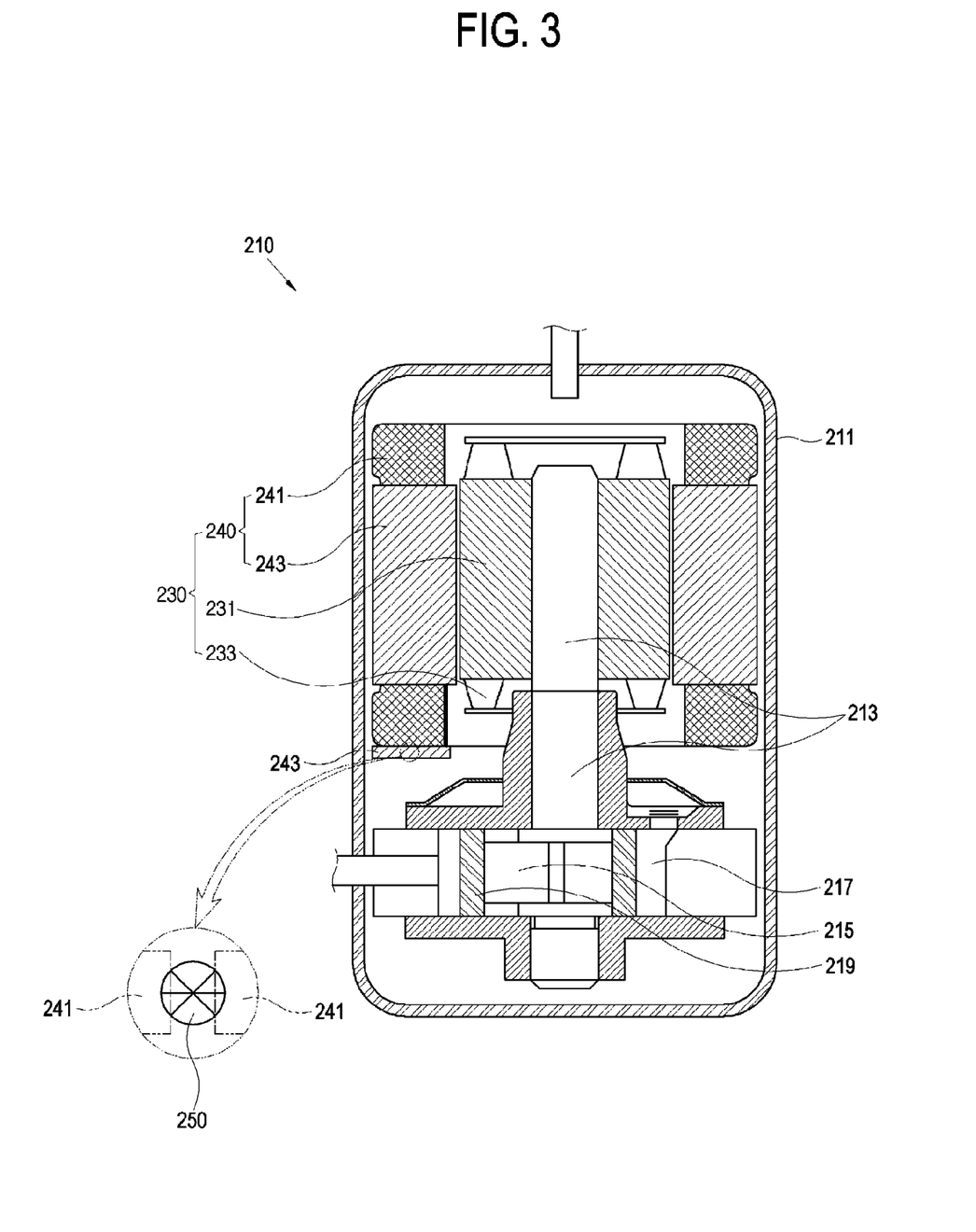
FIG. 3 is a sectional view of a compressor in FIG. 1.

In this example, compressor 210 includes a brushless direct current motor 230, a cylinder 217, a housing 211, a driving shaft 213, a rolling piston 219, a control part 270, and a sensor part 280. The compressor 210 may further include an accumulator (not shown) including a gas liquid separating pipe (not shown). The compressor 210 may further include a rectifier 291, and an inverter part 293.

The housing 211 forms an external appearance of the compressor 210. The housing 211 includes a lower casing (not shown) and an upper casing (not shown), and accommodates various components therein.

The driving shaft 213 has an elongated bar shape, and transmits a rotation force of a rotor 231 to the rolling piston 219. The driving shaft 213 includes an eccentric member 215 provided to a part coupled with the rolling piston 219 to be eccentric with respect to the center of the driving shaft 213.

As the driving shaft 213 rotates, a radial load in a radial direction and a thrust load in a rotational direction of the shaft 213 are generated.

The cylinder 217 is formed in a lower part of the housing 211 so that a compressed refrigerant can flow in and out. The cylinder 217 communicates with a valve (not shown), etc. so that the refrigerant may be sucked from and discharged into the cylinder 217. The rolling piston 219 is eccentrically disposed inside the cylinder 217.

The rolling piston 219 is coupled with the eccentric member 215 of the driving shaft 213 to rotate together with the eccentric member 215 as the driving shaft 213 rotates.

A vane (not shown) is coupled to the cylinder 217 to move into and out of the cylinder 217 to reciprocate in a radial direction of the driving shaft 213. An end part of the vane contacts an outer surface of the rolling piston 219 to create a compression chamber and a suction chamber within the cylinder 217.

The brushless direct current motor 230 includes the rotor 231, a stator 240 and a load prevention part 250.

The rotor 231 includes a permanent magnet 233 to generate a magnetic field. The rotor 231 is coupled with the driving shaft 213 to rotate.

Figure 4:
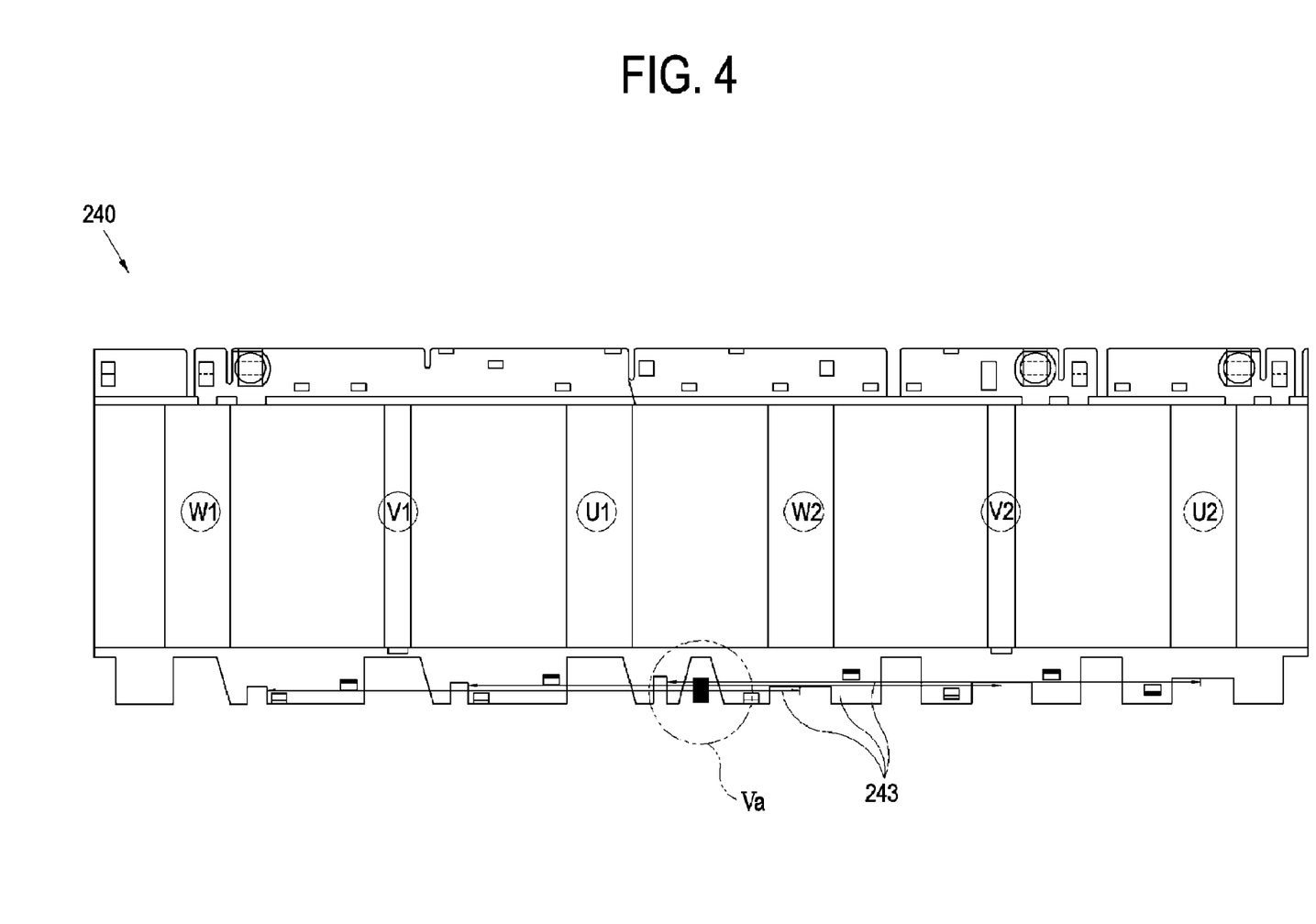
FIG. 4 is a spread view of a stator in FIG. 3.

A plurality of coils 243 are wound around one or more iron cores 241 and when supplied with power, generate an electric field to generate torque by interaction with a magnetic field generated by the permanent magnet 233 of the rotor 231. The load prevention part 250 is coupled to a lower end part of the stator 240.

The coils 243 are arranged in a plurality of phases U, V and W, and are wound around one or more iron cores 241. An insulating member (not shown) is disposed between each coil 243 and the associated iron core 241. Each coil 243 is electrically connected with a stationary contact point 251a of a casing 251 of the load prevention part 250. The coils 243 are exemplarily arranged in three phases U, V and W. Alternatively, the coils 243 may be arranged in phases of six, twelve, etc. The coils 243 may further include a coil for grounding.

The plurality of phases of the coils 243 are referred to as U1, U2, V1, V2, W1 and W2 for discriminating reciprocal connections as illustrated in the figures. Hereinafter, for a convenient description, U1 and U2 may be referred to U, V1 and V2 may be referred to V, and W1 and W2 may be referred to W.

Figure 5A:
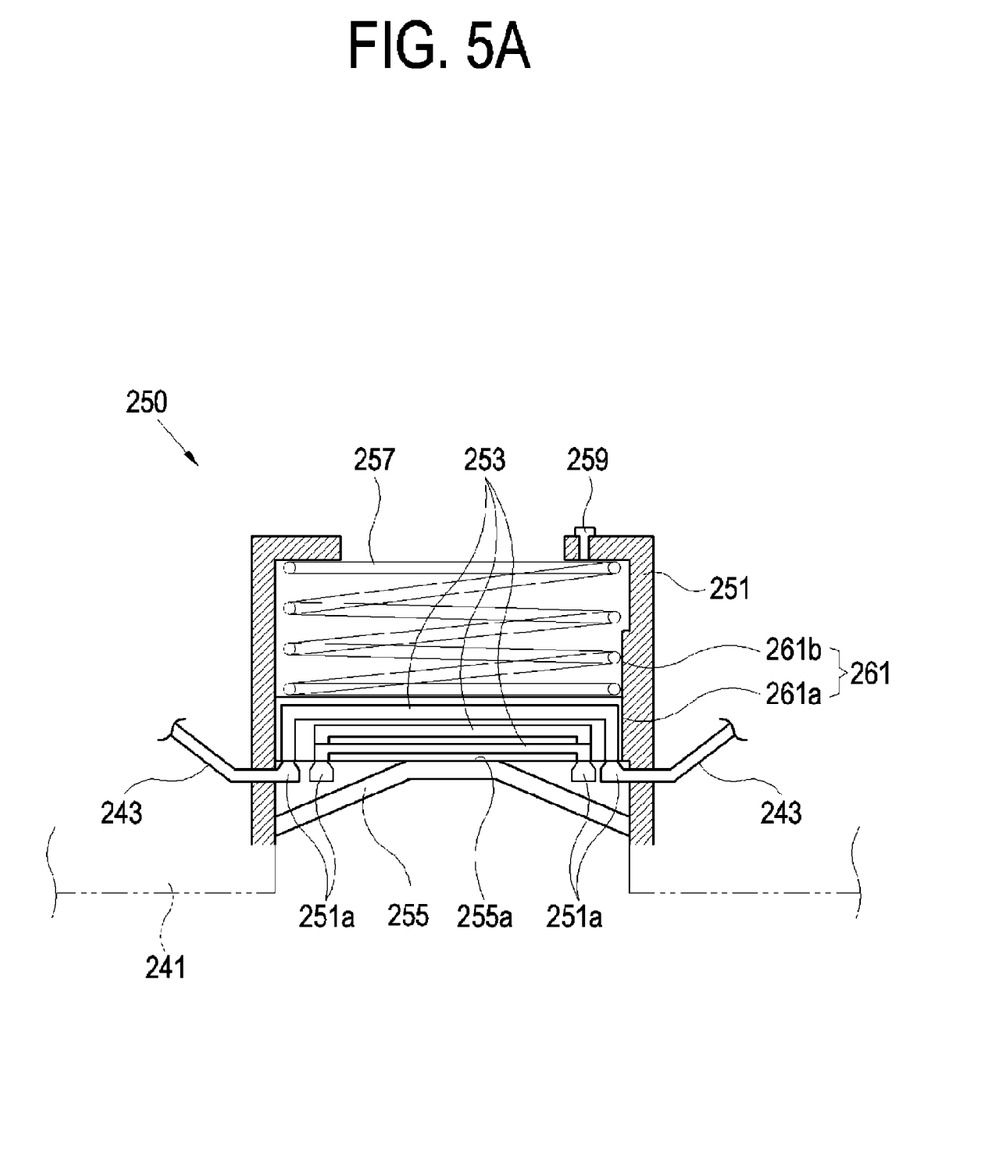
FIG. 5A is an enlarged sectional view of a load prevention part.
Figure 5B:
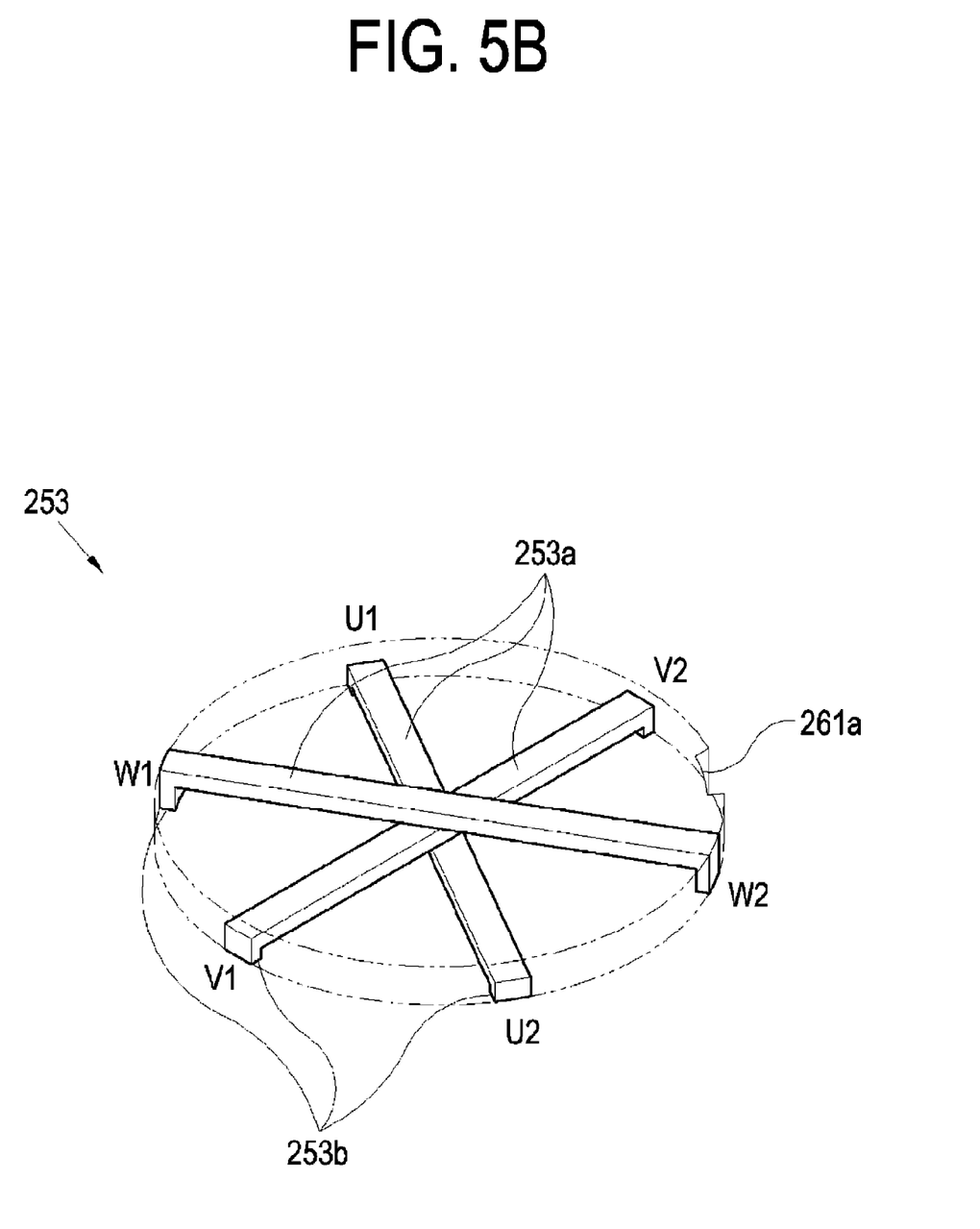
FIG. 5B is a perspective view of a moveable member in FIG. 5A.

In this example, load prevention part 250 includes the casing 251, a moveable member 253, a transformable member 255, an elastic member 257, a movement sensor 259, and a rotation prevention member 261.

The casing 251 is connected to the stator 240, and is coupled with each phase U, V and W of the coils 243. The casing 251 preferably is made of a nonconductive material. The casing 251 may have various shapes such as a cylindrical shape, a rectangular tube shape, etc. formed about an inner space. The casing 251 respectively supports the stationary contact point 251a in a central area thereof, and the transformable member 255 in a lower area thereof. The movement sensor 259 may be disposed to an upper part of the casing 251 as desired. The casing 251 may be supported by an insulating member, such as plastic, to insulate the iron cores 241 from the coils 243.

The moveable member 253 is coupled to an inner part of the casing 251 to connect pairs of coils (of coils 243), each pair associated with one of the plurality of phases U, V and W. Specifically, the moveable member 253 includes moveable signal lines 253a each having movable contact points provided at opposite ends thereof to contact the stationary contact points 251a of a coil pair of a corresponding phase. The moveable member 253 has a circular plate shape, and the moveable signal lines 253a are layered so that the moveable signal lines 253a crossing each other are not electrically connected with each other.

The moveable member 253 moves according to a temperature variation between a connected position in contact and electrically connected with the stationary contact point 251a of the casing 251, and a disconnected position, separated from the coils 243, out of contact and electrically disconnected with the stationary contact points 251a. The moveable member 253 may include rotation prevention member 261 to prevent rotation with respect to a moving axis of the moveable member 253 when the moveable member 253 moves up and down between the connected position and the disconnected position. In this example, the absence of current flowing in the coils 243 may be sensed by a terminal voltage sensor 283 to determine that the moveable member 253 has moved to separate the stationary contact points 251a from the moveable contact points 253b to determine that the plurality of phases U, V and W of the coils 243 are not electrically connected.

The transformable member 255 is supported by the casing 251 and is transformed according to a temperature variation to move the moveable member 253 between the connected position and the disconnected position according to the transformation. The transformable member 255 includes material such as a bimetal transformed according to the temperature variation. The transformable member 255 includes a flat part 255a positioned to surface-contact a central area surface of the moveable member 253 so that the moveable member 253 can stably move without tilting. Accordingly, the stationary contact point 251a can stably contact and separate from the moveable contact point 253b.

The transformable member 255 has a thin circular plate shape. Alternatively, the transformable member 255 may have various shapes such as a long rod shape, etc. as necessary. That is, the transformable member 255 may have a shape, a thickness, a size, etc. so that the stationary contact point 251a and the moveable contact point 253b are separated from each other to electrically disconnect each coil pair of phases U, V and W.

Accordingly, the transformable member 255 may be easily transformed according to a temperature variation of an inner part of the casing 251 or the stator 240. Since the transformation of the transformable member 255 reflects the temperature variation of an inside part of the compressor 210 at the most adjacent position, reliability of the compressor 210 is improved.

Here, the control part may discontinue power supply applied to the stator 240 when the transformable member 255 moves from the connected position to the disconnected position.

The elastic member 257 is interposed between the casing 251 and the moveable member 253 to elastically press the moveable member 253 toward the transformable member 255. The elastic member 257 has an elastic force pressing the moveable member 253 toward the transformable member 255 so that the moveable contact points 253b contact the stationary contact points 251a to connect the coil pairs (of coils 243) when the transformable member 255 has not been transformed due to a dangerous temperature.

Accordingly, the stationary contact point 251a can be kept to be stably contacted with the moveable contact point 253b by the press of the elastic member 257.

The movement sensor 259 is coupled to the casing 251 to sense a movement of the moveable member 253. That is, the movement sensor 259 senses whether the moveable member 253 moves between the connected position and the disconnected position according to the temperature variation of the transformation member 255. The movement sensor 259 may selectively employ various known sensors such as a photo sensor, etc., being capable of measuring the displacement of the moveable member 253. A result sensed by the movement sensor 259 is transmitted to the control part 270. Accordingly, the control part 270 can control power supplied to the stator 240 based on a received signal, e.g., from the movement sensor 259, indicating that the moveable member 253 is electrically disconnected.

Accordingly, the movement of the moveable member 253 can be stably sensed.

The rotation prevention member 261 prevents the moveable member 253 from rotating about the moving axis when the moveable member 253 moves between the connected position and the disconnected position. As illustrated in FIGS. 5A and 5B, the rotation prevention member 261 includes a rotation prevention slot 261a formed within the moveable member 253, and a rotation prevention protrusion 261b protruding from an inners wall of the casing 251 and engaged with the rotation prevention slot 261a to guide the moveable member 253. Alternatively, the rotation prevention slot 261a may be provided on the inner wall of the casing 251, and the rotation prevention protrusion 261b may be provided on the moveable member 253.

Accordingly, the moveable member 253 can stably move between the connected position and the disconnected position without rotating.

Accordingly, even when the compressor 210 operates in a poor environment, the brushless direct current motor 230 is protected despite any temperature variation of the interior of the compressor 210. Also, the load prevention part 250 may have a simple configuration.

The control part 270 may control the brushless direct current motor 230 not to operate if the transformable member 255 is transformed so that the moveable member 253 is moved from the coils 243 and electrically disconnected therewith. That is, if the moveable member 253 is positioned at the disconnected position, the control part 270 may not supply power to the stator 240, and if the moveable member 253 is positioned at the connected position, the control part 270 may supply the power to the stator 240. The control part 270 may include an algorithm regulating the power supply depending on the movement of the moveable member 253.

In this example, control part 270 generates a pulse width modulated (PWM) control signal based on results of a current sensor 281, a phase sensor 285 and the terminal voltage sensor 283, and transmits the PWM control signal to the inverter part 293.

The sensor part 280 includes the phase sensor 285 which may be a hall sensor, a resolver element, an encoder, and/or other known sensors in the art sensing the position of the rotor 231 of the brushless direct current motor 230. The phase sensor 285 may include a senseless type phase sensor to indirectly sense the position of the rotor 231. The sensor part 280 may further include the terminal voltage sensor 283 to sense the amount of current applied to the stator 240.

Accordingly, the brushless direct current motor 230 can stably operate, and reliability of the operation can be improved.

The rectifier 291 rectifies an alternating current power to supply a direct current power, and includes a rectifier (not shown), and a smoothing condenser (not shown).

The inverter part 293 inverts the direct current power supplied from the rectifier 291 into a pulse type alternating current power of three phases U, V and W having a variable frequency, and supplies the alternating current power to the brushless direct current motor 230. In this example, inverter part 293 includes a known switching circuit with six switching elements Q1 to Q6, and six diodes.

The current sensor 281 senses current rectified by the rectifier 291.

Accordingly, the control part 270 can generate the PWM control signal in a signal generating unit 271 based on the results of the sensor part 280, the movement sensor 259, etc., and transmit the PWM control signal to the inverter part 293. Here, the control part 270 may control power supplied to the stator 240 in consideration of the position of the moveable member 253 according to the temperature variation of the inner part of the compressor 210.

Here, the control part 270 may be part of the outdoor control part 125 if desired.

Hereinafter, an operating process of the compressor 210 of the air conditioner 100 according to an exemplary embodiment will be described by referring to FIGS. 1, 2, 3 and 6A to 6C.

If power is supplied to the air conditioner 100, the power is converted by the rectifier 291 and the inverter part 293 to be supplied to the stator 240 of the compressor 210. Accordingly, the rotor 231 and the driving shaft 213 coupled to the rotor 231 rotate by interaction of the stator 240 and the rotor 231. As the eccentric member 215 provided to the lower part of the driving shaft 213 rotates, the rolling piston 219 coupled to an outer surface of the eccentric member 215 rotates. Accordingly, the suction chamber and the compression chamber are partitioned by means of the vane coupled to the cylinder 217 to be contacted with the rolling piston 219, and a process of sucking, compressing and discharging of the refrigerant is repeated by rotation of the rolling piston 219.

That is, if a user selects a heating mode of the air conditioner 100, the compressor 210 compresses a refrigerant. The compressed refrigerant is supplied to the indoor heat exchanger 111, and heat is exchanged between the indoor air and the indoor heat exchanger 111 using the indoor fan 113 so that heated air can be transferred into a room, thereby heating the room. The refrigerant passing through the indoor heat exchanger 111 is supplied to the outdoor heat exchanger 121.

If the user selects a cooling mode of the air conditioner 100, the compressor 210 compresses the refrigerant. The compressed refrigerant is supplied to the outdoor heat exchanger 121 and evaporated in the indoor heat exchanger 111, and heat is exchanged between the indoor air and the indoor heat exchanger 111 using the indoor fan 113 so that a cooled air can blow into the room, thereby cooling the room. The refrigerant passing through the indoor unit 110 is returned to the compressor 210, and the outdoor heat exchanger 121.

In this process, the control part 270 controls power supply to the brushless direct current motor 230 as described above.

Figure 6A:
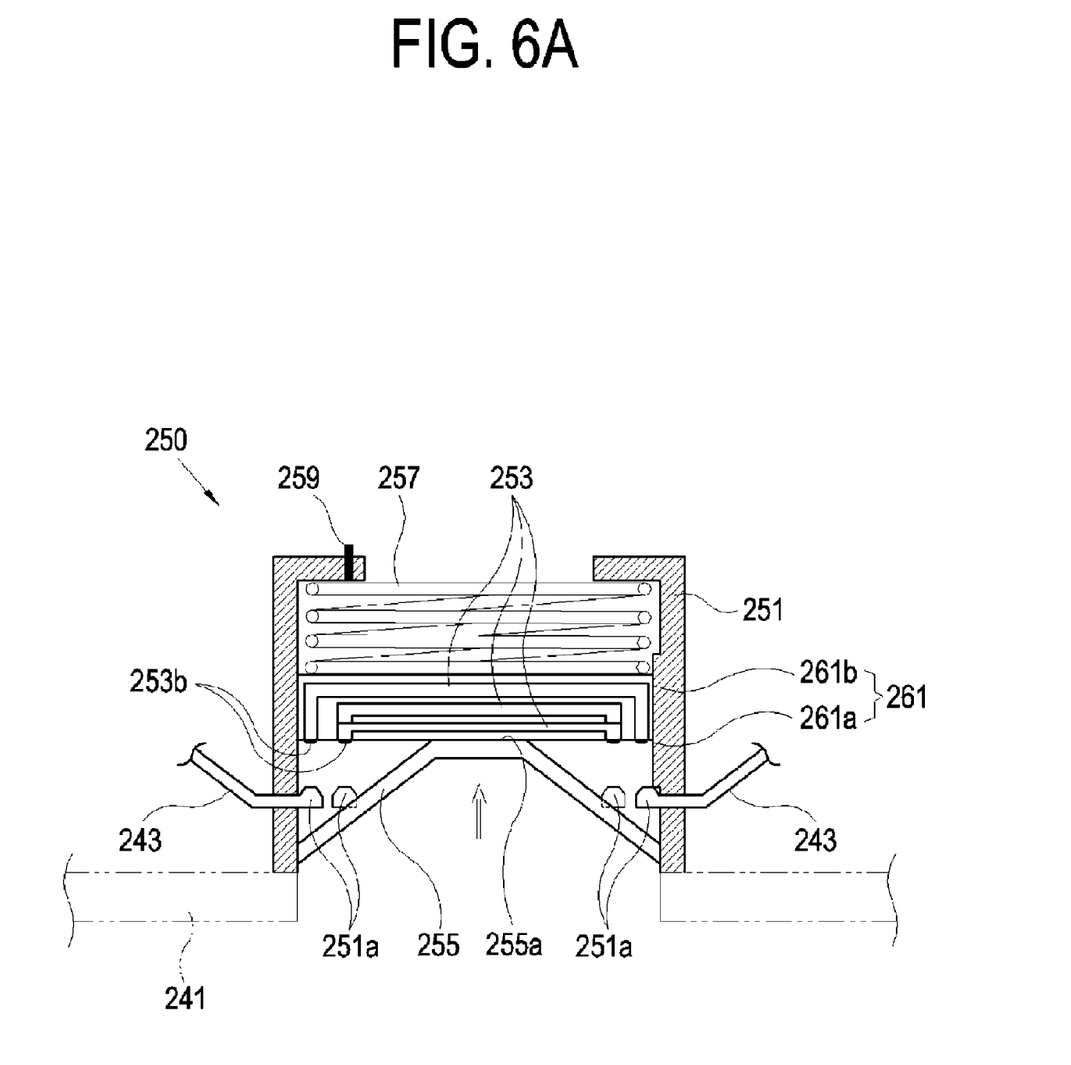
FIGS. 6A to 6C are a sectional view and circuit connecting diagrams illustrating an operating state of the load prevention part.

Hereinafter, transformation of the transformable member 255 due to a dangerous temperature such as an abnormal high temperature of the inner part of the compressor 210 during a normal operating process will be described.

At first, as illustrated in FIG. 6A, if an abnormal temperature is generated inside the compressor 210, the transformable member 255 is expanded so that flat part 255a overcomes a pressing force of the elastic member 257 to upwardly lift the moveable member 253. Thus, the elastic member 257 contracts. Accordingly, the stationary contact point 251a and the moveable contact point 253b are separated from each other to electrically disconnect each of the coil pairs (of coils 243) associated with phases U, V and W.

Figure 6B:
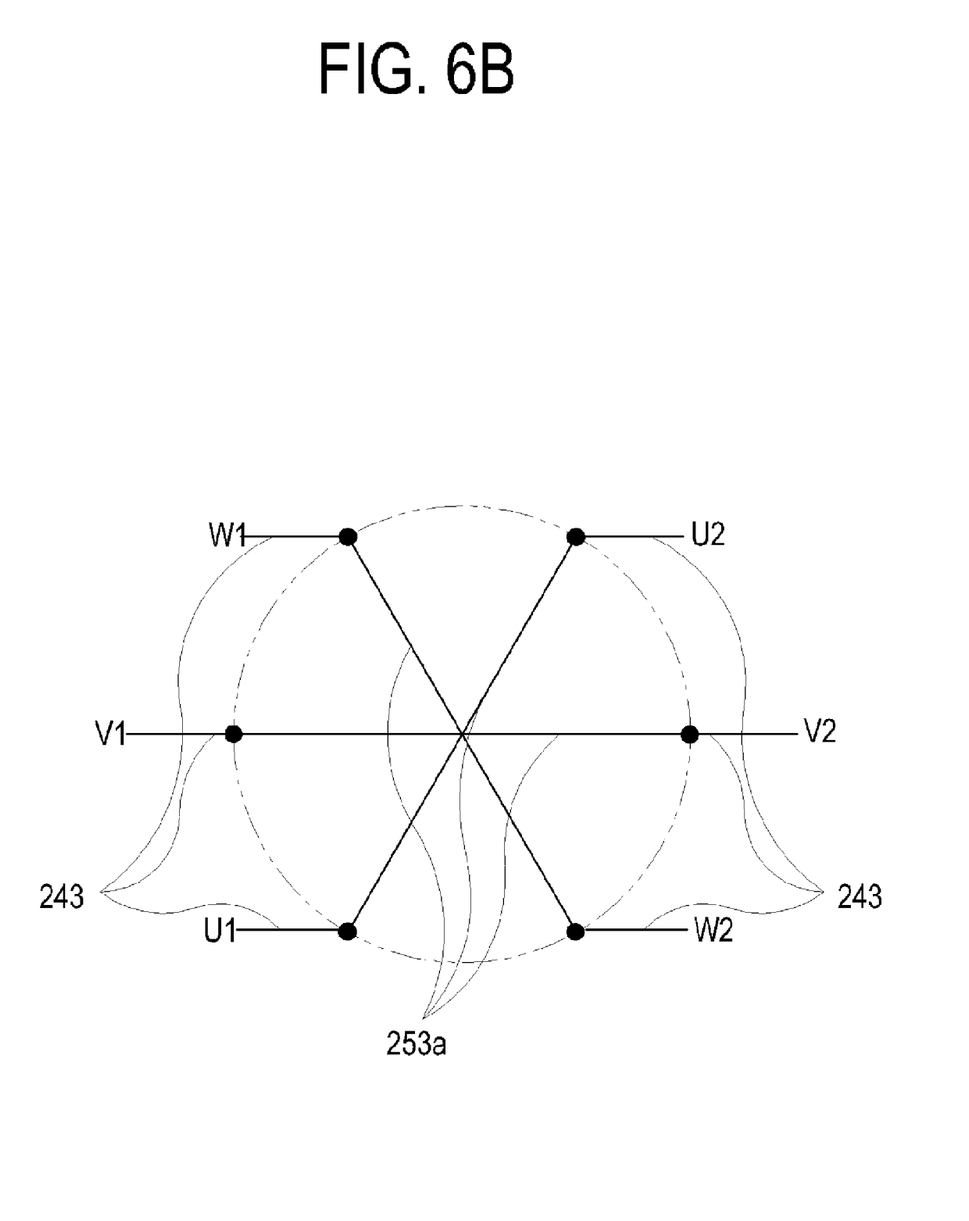
Figure 6C:
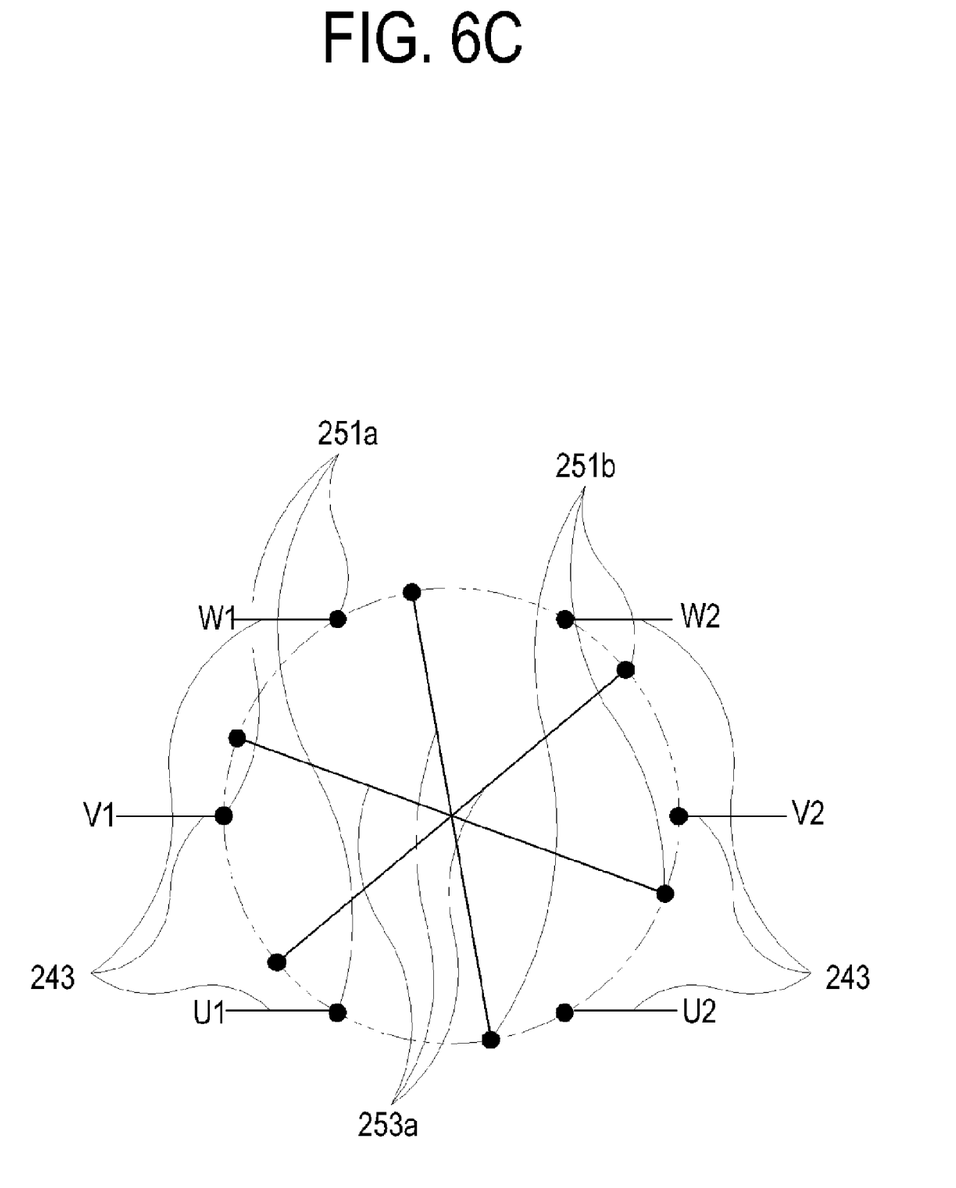

That is, as illustrated in FIGS. 6B and 6C, the coil pairs 243 are changed from an electrical connecting state in which each of the coil pairs associated with phases U, V and W are electrically connected (as illustrated in FIG. 6B) to an electrical disconnecting state in which each of coil pairs associated with the phases U, V and W are electrically disconnected (as illustrated in FIG. 6C).

The disconnection of the coil pairs may be sensed by the movement sensor 259 or the terminal voltage sensor 283, and the sensed result is transmitted to the control part 270. Accordingly, power supplied to the brushless direct current motor 230 may be cut off based on the sensed result. Preferably, an algorithm is used to determine whether to cut off power supplied to the brushless direct current motor 230.

Then, if the temperature of the inner part of the compressor 210 becomes normal, the return of the movable member 253 to the connected position is sensed by the movement sensor 259 or the terminal voltage sensor 283, and the control part 270 responds to supply the power to the brushless direct current motor 230.

The air conditioner according to the present general inventive concept may be applied to an air conditioner of various known types and is not limited to an indoor unit, an outdoor unit, a heat pump, etc.

As described above, the present general inventive concept provides a brushless direct current motor, a compressor and an air conditioner having the same reliably operable within various environments.

Also, the present general inventive concept provides a brushless direct current motor, a compressor and an air conditioner having the same with a simple configuration more accurately responsive to the temperature of the motor of the environment within which it is used, thereby improving reliability.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents. As used in this disclosure, the term "preferably" is non-exclusive and means "preferably, but not limited to." Terms in the claims should be given their broadest interpretation consistent with the general inventive concept as set forth in this description. For example, the terms "coupled" and "connect" (and derivations thereof) are used to connote both direct and indirect connections/couplings. As another example, "having" and "including", derivatives thereof and similar transition terms or phrases are used synonymously with "comprising" (i.e., all are considered "open ended" terms)—only the phrases "consisting of" and "consisting essentially of" should be considered as "close ended". Claims are not intended to be interpreted under 112 sixth paragraph unless the phrase "means for" and an associated function appear in a claim and the claim fails to recite sufficient structure to perform such function.

What is claimed is:

1. A brushless direct current motor, comprising:
a rotor which comprises a permanent magnet;
a stator which comprises plurality of coils arranged in phases which form an electrical field to generate a torque by interaction with a magnetic field which is generated by the permanent magnet, the plurality of coils also being arranged in groups, each group of coils being associated with a corresponding phase, and coils of each group being connected to each other with electrical connections; and
a load prevention part which is disposed inside the stator and in an area in which the electrical connections connecting coils of each group electrically overlap with one another to electrically connect and disconnect the coils according to a temperature variation.

2. The brushless direct current motor according to claim 1, wherein the plurality of coils are arranged in groups, each group of coils being associated with a corresponding phase, and wherein the load prevention part comprises:
a casing which is coupled to the stator,
a moveable member which is disposed within the casing to connect coils of each group of coils, and
a transformable member which is coupled to the casing to move between a connected position in which the moveable member is connected with the coils, and a disconnected position in which the moveable member is disconnected from the coils.

3. The brushless direct current motor according to claim 2, wherein the transformable member comprises a bimetal.

4. The brushless direct current motor according to claim 2, wherein the load prevention part further comprises an elastic member which elastically presses the moveable member toward the transformable member.

5. A compressor, comprising:
a brushless direct current motor which comprises a rotor which comprises a permanent magnet, a stator which comprises a plurality of coils, associated with corresponding phases, which form an electrical field to generate a torque by interaction with a magnetic field which is generated by the permanent magnet the plurality of coils being arranged in groups, each group of coils being associated with a corresponding phase, and coils of each group being connected to each other with electrical connections, and a load prevention part which is disposed inside the stator and in an area in which the electrical connections connecting coils of each group electrically overlap with one another to electrically connect and disconnect the coil of the plurality of phases according to a temperature variation; and a cylinder which compresses a substance by rotation of the brushless direct current motor.

6. The compressor according to claim 5, wherein the plurality of coils are arranged in groups, each group of coils being associated with a corresponding phase, and wherein the load prevention part comprises:
a casing which is coupled to the stator,
a moveable member which is disposed at an inner side of the casing to connect coils of each group of coils, and
a transformable member which is coupled to the casing to be transformed according to a temperature variation to move the moveable member.

7. The compressor according to claim 6, wherein the load prevention part further comprises:
an elastic member which elastically presses the moveable member toward the transformable member.

8. The compressor according to claim 6, further comprising:
a control part which controls the brushless direct current motor not to operate if the transformable member is transformed to separate the moveable member from the coil.

9. An air conditioner, comprising:
a compressor to compress a refrigerant, and comprising:
a brushless direct current motor which comprises a rotor which comprises a permanent magnet, a stator which comprises a plurality of coils, associated with corresponding phases, which form an electrical field to generate a torque by interaction with a magnetic field which is generated by the permanent magnet, the plurality of coils being arranged in groups, each group of coils being associated with a corresponding phase, and coils of each group being connected to each other with electrical connections, and a load prevention part which is disposed inside the stator and in an area in which the electrical connections connecting coils of each group electrically overlap with one another to electrically connect and disconnect the coil of the plurality of phases according to a temperature variation; and
a cylinder which compresses a substance by rotation of the brushless direct current motor;
a heat exchanger to evaporate the refrigerant which is compressed by the compressor; and
a fan to form a flow to allow heat exchange with the heat exchanger.

10. The air conditioner of claim 9, wherein the plurality of coils are arranged in groups, each group of coils being associated with a corresponding phase, and wherein the load prevention part comprises
a casing which is coupled to the stator,
a moveable member which is disposed to an inner side of the casing to connect coils of each group of coils, and
a transformable member which is coupled to the casing to be transformed according to a temperature variation to move the moveable member.

11. The air conditioner according to claim 9, wherein the load prevention part further comprises an elastic member which elastically presses the moveable member toward the transformable member.

12. The air conditioner according to claim 9, further comprising:
a control part which controls the brushless direct current motor not to operate if the transformable member is transformed to separate the moveable member from the coil.

* * * * *